United States Patent
Trinks et al.

(10) Patent No.: US 6,674,043 B2
(45) Date of Patent: Jan. 6, 2004

(54) METHOD AND APPARATUS FOR MARKING GLASS WITH A LASER

(75) Inventors: Ulla Trinks, Mitterteich (DE); André Witzmann, Waldershof (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/139,622

(22) Filed: May 6, 2002

(65) Prior Publication Data

US 2003/0029849 A1 Feb. 13, 2003

(30) Foreign Application Priority Data

May 8, 2001 (DE) .......................... 101 22 335

(51) Int. Cl.[7] .............................. B23K 26/00
(52) U.S. Cl. ................................ 219/121.69
(58) Field of Search ............... 219/121.69, 121.61, 219/121.68, 121.67, 121.65, 121.66; 347/224

(56) References Cited

U.S. PATENT DOCUMENTS

| | | | |
|---|---|---|---|
| 1,218,598 A | | 3/1917 | Danner |
| 4,498,917 A | * | 2/1985 | Weinstein et al. ............. 65/382 |
| 4,606,747 A | | 8/1986 | Steinhoff |
| 5,206,496 A | | 4/1993 | Clement et al. |
| 6,034,349 A | * | 3/2000 | Ota ........................ 219/121.73 |
| 6,443,945 B1 | * | 9/2002 | Marchitto et al. ............. 606/7 |

FOREIGN PATENT DOCUMENTS

| | | |
|---|---|---|
| DE | 1025581 | 8/1958 |
| DE | 31 21 138 C2 | 3/1982 |
| DE | 3145278 C2 | 5/1983 |
| DE | 3425263 A1 | 1/1985 |
| DE | 41 26 626 C2 | 2/1992 |
| DE | 41 32 817 A1 | 4/1993 |
| DE | 42 24 282 A1 | 1/1994 |
| DE | 44 07 547 C2 | 9/1995 |
| DE | 199 26 878 A1 | 12/1999 |
| DE | 198 23 257 A1 | 2/2000 |
| EP | 0 535 620 B1 | 8/1995 |
| EP | 0 761 377 B1 | 6/1999 |
| GB | 2078621 A | 1/1982 |
| JP | 09278494 A | 10/1997 |
| JP | 10101379 A | 4/1998 |
| WO | WO 92/03297 A1 | 3/1992 |
| WO | WO 94/14567 | 7/1994 |
| WO | WO 95/05286 A1 | 2/1995 |
| WO | WO 96/10777 A1 | 4/1996 |
| WO | WO 99/00215 A1 | 1/1999 |
| WO | WO 00/32349 A1 | 6/2000 |
| WO | WO 00/32531 A1 | 6/2000 |

* cited by examiner

*Primary Examiner*—Tom Dunn
*Assistant Examiner*—Jonathan Johnson
(74) *Attorney, Agent, or Firm*—Martin Fleit; Paul D. Bianco; Fleit Kain Gibbons Gutman Bongini & Bianco P.L.

(57) ABSTRACT

In an apparatus and a method for marking glass with a laser, the glass is first brought to a temperature above the transformation temperature of the glass. The glass is then acted upon by a laser pulse which produces a mark on the surface of the glass. The peak power of the laser pulse is preferably selected so that it is merely a thermal interaction with the glass surface which occurs. This has the advantage that the material properties of the marked glass remain unchanged compared with the unmarked product.

9 Claims, 5 Drawing Sheets

US 6,674,043 B2

METHOD AND APPARATUS FOR MARKING GLASS WITH A LASER

FIELD OF THE INVENTION

This invention relates to a method and apparatus for marking glass with a laser, particularly in a tube drawing installation.

BACKGROUND AND PRIOR ART

Various methods are known from the prior art for marking or inscribing glass by means of laser radiation:

A method of producing a body from transparent material with a mark in the inside of the body, is known from DE 44 07 547 C2, wherein there is a limited space in the interior of the body in which point-like microcracks are formed by laser radiation. The microcracks have a diameter such that that they are visible to the naked eye.

WO 92/03297 A1 (=DE 41 266 26 C2) relates to a similar method, wherein the material in the interior of the glass body to be marked is ionized by laser radiation, so that microcracks are likewise formed.

Another similar method is known from WO 94/114567, wherein an image is generated in the interior of the body by the formation of local microcracks.

The aforementioned methods which are known from the prior art employ solid-state lasers (Nd:YAG) with a high energy density of $>10^7$ W/cm$^2$. A disadvantage of the aforementioned methods is that it is only certain glasses which react with laser radiation of this type. Another disadvantage is that the microcrack structure impairs the material properties of the marked glass.

Methods of marking glass which also employ solid lasers (Nd:YAG) are known from WO 00/32349 A1 and WO 00/32531 A1, wherein the laser parameters are selected so no fracture-inducing microcracks are formed. A disadvantage of these methods, however, is that only marks which are invisible to the naked eye can be produced. A further disadvantage is that focusing the laser-beam in the interior of the glass body presupposes a sufficiently large volume of glass or a minimum wall thickness of at least 1 mm, for example, in order to prevent crack growth as far as the surface.

In order to achieve an interaction or a marking effect despite the extensive transparency of glass to the wavelengths from solid-state lasers, it is known that absorbent layers can be applied to the glass. A method such as this is known from EP 07 613 77 B1, wherein a Nd:YAG laser with a wavelength of 1.06 µm, for example, is used for marking the applied layer of material. Furthermore, a corresponding method, wherein a metal-doped special glass is marked by an Nd:YAG laser, is known from DE 422 428 2 A1.

A method for internally marking a glass body without changing the glass surface is known from WO 95/05286 A1. For this purpose, a CO$_2$ laser is used which has an energy density of at least 6 kW/cm$^2$ at its focus, in order to introduce local stresses under the surface to a depth of about 50 µm. A disadvantage of this method is that the marks are not visible to the naked eye.

Moreover, a method of decorating glass products is known from DE 312 1138 C2, wherein a laser beam is employed which has a maximum energy such that glass material is evaporated from the surface layer or such that a change in the optical transparency of the glass is produced.

Another method of removing material from a glass surface by means of a laser beam is known from DE 314 5278 C2, wherein the laser beam is subdivided into a multiplicity of individual beams by a partially absorbing matrix.

Furthermore, a method wherein the glass is melted by a laser beam at certain points on the surface to be treated is known from the DE 413 2817 A1. This material removal method has the disadvantage that extraction devices are necessary in order to remove volatilised glass material. Moreover, there is a deleterious effect on the properties of the material.

One particular disadvantage of the aforementioned methods is the requisite heat treatment of the glass before, during or after laser treatment in order to relieve the glass from stress, since laser treatment takes place at temperatures below the transformation temperature.

A method of engraving glass vessels by means of laser beams is known from DE 199 26878 A1. This method employs an enamel which consists of a combination of a vitrifiable base with a pigment which has the property of reacting under the action of the laser beam and of changing the color of the combination used.

In addition, a method is known from WO 99/00215 A1 which is based on a combination of known methods for the surface marking and internal marking of glass.

A method of the marking a glass surface by means of UV laser radiation is known from WO 96/10777, but this only results in a microstructure which cannot be recognized without visual assistance.

A method of marking a glass substrate is known from JP 09 278494 A. A YLF laser with a wavelength of about 262 nm is used for marking.

Another method of marking glass is known from JP 10 101379 A. This method employs pulsed laser beams with a wavelength of 2300 nm, wherein each location which is to be marked on the glass is acted upon between three and one hundred times by a laser beam.

A method of providing a body of material made of glass or plastics with a mark situated under the surface is known from DE 41 26 626 C2. For this purpose, a beam of high energy density, to which the material is permeable, is directed toward the surface of the body of material. The beam is focused at a point which is at a distance from the surface and which is disposed inside the body of material, whereby a mark is produced.

A method of inscribing information within the bulk of transpatent materials by means of a laser beam is known from DE 34 25 263 A1, wherein the information can be inscribed at various depths within the material by the choice of focusing of the laser beam.

A method of producing a defined, durable change, by means of intensive laser pulses, in the extinction spectrum of dielectric materials which contain metal particles is known from DE 198 23 257 A1. The change is produced by irradiating an extinction band caused by the excitation of surface plasmons in the metal particles with intensive laser light.

It is therefore an object of the present invention to create an improved method and an improved apparatus for marking glass by means of a laser.

SUMMARY OF THE INVENTION

The invention provides for a method of marking glass whereby a laser pulse is used to apply a mark to a surface of the glass at a position where the glass temperature is above the transformation temperature of the glass. Further the invention provides for an apparatus for marking glass, in particular a tube drawing installation, for performing the method of the invention.

The invention enables the marking of glass to be incorporated into the production process, for example in a tube drawing installation. The need for separate processing steps for the application of marks after the production of the glass is thereby dispensed with.

Furthermore, the invention enables a mark, which is clearly visible but which is free from micro-cracks, to be applied to the glass even at high temperatures during the manufacture of the tube. The possible incorporation of a marking operation into the production process enables the high temperatures which exist anyway to be used for the application of the method according to the invention, without these temperatures, which are higher than the transformation temperature of the glass, having to be generated in subsequent processing steps.

One particular advantage of the invention is that it can be included in a continuous production process without delaying or otherwise adversely affecting the latter.

Another advantage is that the invention enables low-stress marks to be produced on the surface without microcracks, so that the material properties of the manufactured glass are not disadvantageously affected by the marking process. In a preferred embodiment, the laser beam is controlled so that it reaches its peak power for a short time only. In this respect, the peak power is selected depending on the physical parameters of the glass, for example its thermal expansion coefficient and thermal conductivity, in order to minimize the introduction of stress into the glass.

Preferably the laser power is set to a level where the laser pulse which impinges upon the glass surface which is already above its transformation temperature momentarily melts a small amount of glass on the glass surface to form the mark without evaporating a substantial amount of glass. This purely thermal interaction is sufficient for the application of visible marks to the glass surface, since the glass tobe marked is at a temperature above the transformation temperature, and the glass is therefore more easily workable. Accordingly, only a relatively low laser power is necessary for the application of marks.

In a preferred embodiment, a pulsed quasi-continuous $CO_2$ laser beam is employed. By employing different pulse/spacing ratios of the laser beam, any durable marks of different patterns, for example points, strokes or lines, can be produced on the glass surface which moves past the laser.

The control system for generating the laser beam can advantageously be connected to measuring instruments. This enables the glass to be marked corresponding to defects which have been identified by measuring devices for quality assurance. For example, if a measuring device determines defects in the glass, e.g. bubbles or protuberances, the measuring device can send a corresponding signal to the control electronics of the laser. As a result, a mark is applied to the surface of the relevant region of the material which can either be used subsequently in the production process to indicate any post-treatment which is necessary or to reject the corresponding product.

The pulse times and/or peak power levels of the laser beam can also be selected so that the marks cannot be discerned by the naked eye but can only be detected under the microscope or by means of a polarimeter. The marks can also be formed so that they are machine-readable, in the form of what is termed a bar code, for example.

With the method according to the invention, marks which cannot be counterfeited can be applied to the glass, for example, in order to combat product piracy. Likewise, trade marks, company logos or other product requisites can be applied to the glass by the method according to the invention so that they cannot be counterfeited, without this having an adverse effect on the material properties of the glass and with complete integration of the application of the mark into the production operation.

Since the method operates without contact, the corresponding apparatus can be constructed so that it can be encased separately from the remainder of the production process. This has the further advantages of ensuring a low maintenance requirement and of enabling a marking unit of simple, mobile design to be employed.

BRIEF DESCRIPTION OF THE DRAWINGS

A preferred embodiment of the invention is explained in more detail below with reference to the drawings, where.

DETAILED DESCRIPTION OF THE INVENTION

Figure 1:
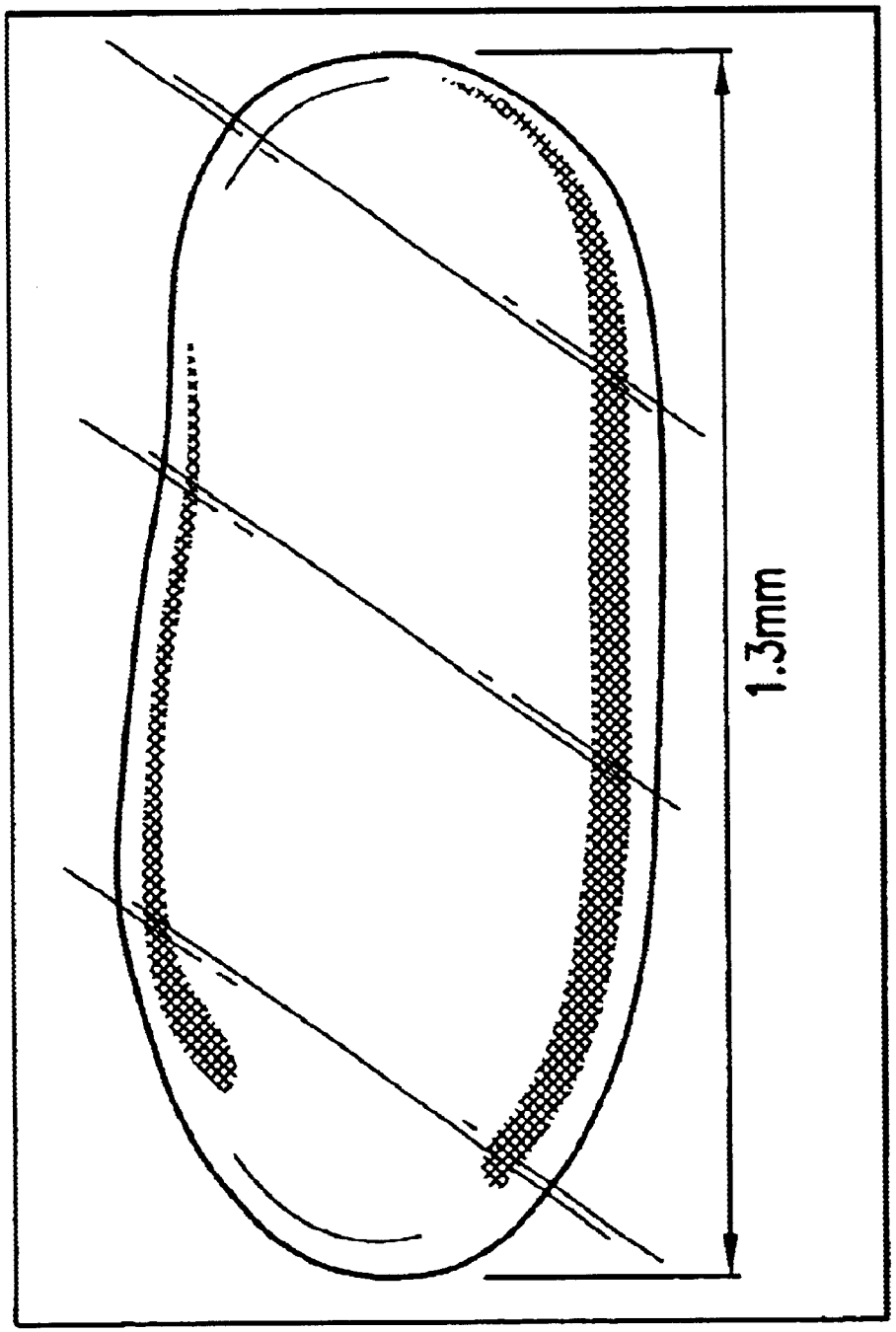
FIG. 1 shows an individual mark produced on the surface of glass by the method according to the invention.

FIG. 1 shows, on an enlarged scale, an individual mark which is produced by means of a laser pulse on a glass surface. For this purpose, the glass to be marked is first brought to a temperature above the transformation temperature of the glass. Depending on the type of glass, a temperature of about 500–600° C. is necessary for this purpose. When the marking method is incorporated in a glass production operation, the corresponding laser marking apparatus is placed at a location of the glass strand passing by at which the requisite marking temperature is higher than the transformation temperature of the glass.

An upper limit is placed on the temperature of the glass surface to be marked, to the effect that there is no other interaction with the available laser power which results in a visible mark.

Thus the interaction of the impinging laser pulse with the glass surface is a purely thermal one which does not result in a physical or chemical change of the glass material. In particular, ionisation of the glass material and the formation of microcracks are thereby substantially prevented.

The mark shown in FIG. 1 has a length of 1.3 mm. The oval shape of the mark is produced because the glass to be marked executes a movement relative to the laser source, so that the length of the oval is determined by the speed of said movement and by the length of the laser pulse.

Figure 2:
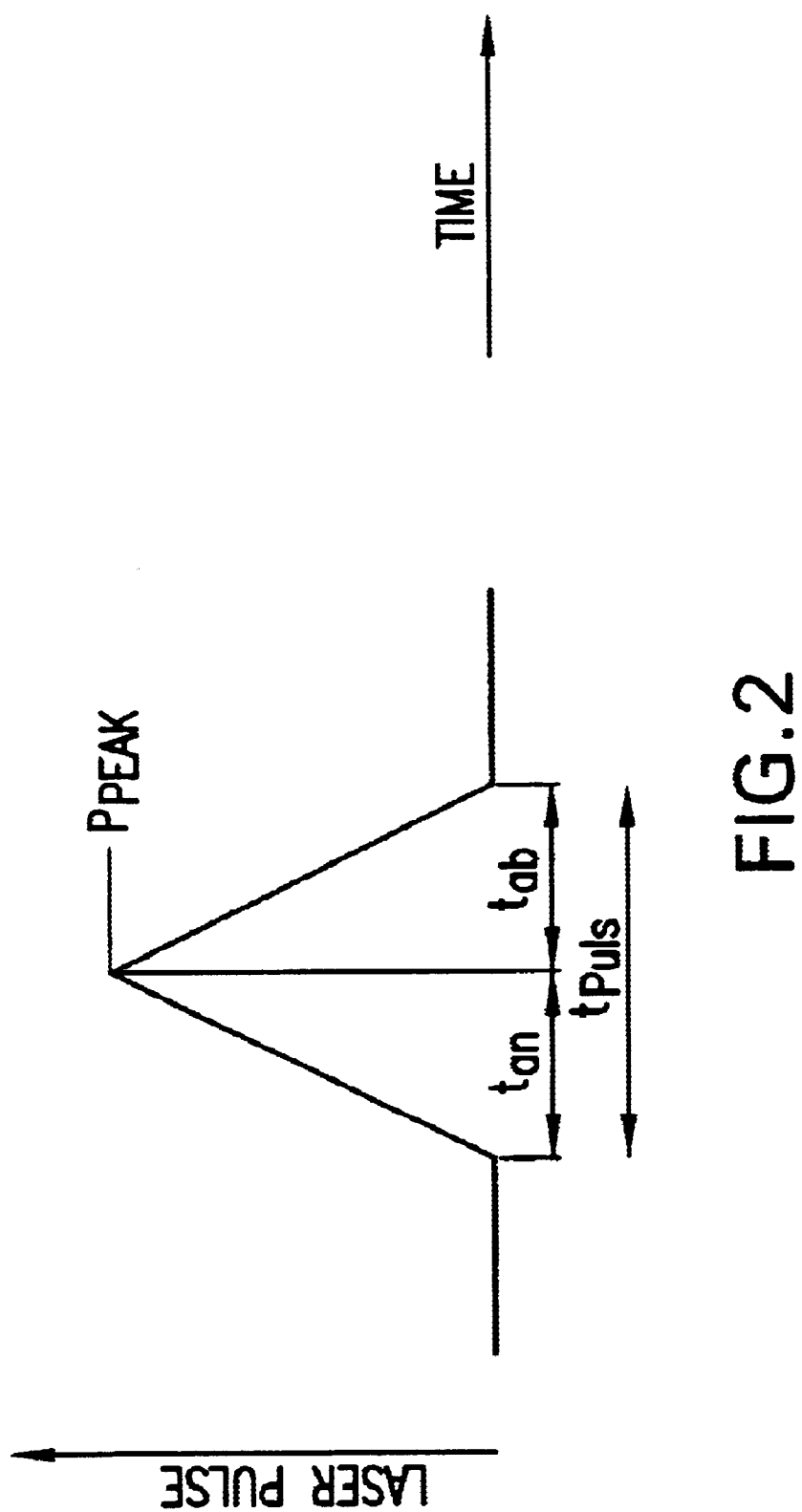
FIG. 2 is a schematic illustration of the shape of the laser pulse for producing a mark on a glass surface.

FIG. 2 shows the time-dependence of the corresponding laser pulse. The laser pulse has a rise time of $t_{an}$. After the rise time, the laser power reaches its maximum, which is denoted as $P_{peak}$ in FIG. 2. Immediately after the maximum laser power is reached, the power decreases to 0 again over the decay time $t_{ab}$.

The maximum power $P_{peak}$ is preferably selected so that apart from a thermal effect there is no further effect on the surface to be processed and on the product. The maximum power $P_{peak}$ is therefore selected depending on the physical parameters of the glass to be marked, i.e. depending on the coefficient of thermal expansion and the thermal conductivity thereof. The chemical characteristics of the glass can also be taken into consideration in this respect.

The rise time $t_{an}$ is advantageously selected as the minimum time which is necessary for reaching the maximum power $P_{peak}$. This minimum time depends on the laser which is used. The choice of laser parameters (pulse width, pulse spacing) depends on the type of the desired mark, for example on the stroke length thereof.

Immediately after the maximum power $P_{peak}$ is reached, the supply of energy to the laser is discontinued, so that the output of the laser pulse decreases to 0 again over the decay time $t_{ab}$, which is likewise a device-dependent parameter. When a $CO_2$ laser is used, the rise and decay times can each be 50 to 60 $\mu$s, which results in a pulse width $t_{pulse}$ of about 100 to 120 $\mu$s. Longer pulse times can also be selected, however, e.g. $t_{pulse}=300$ $\mu$s or longer.

Figure 3:
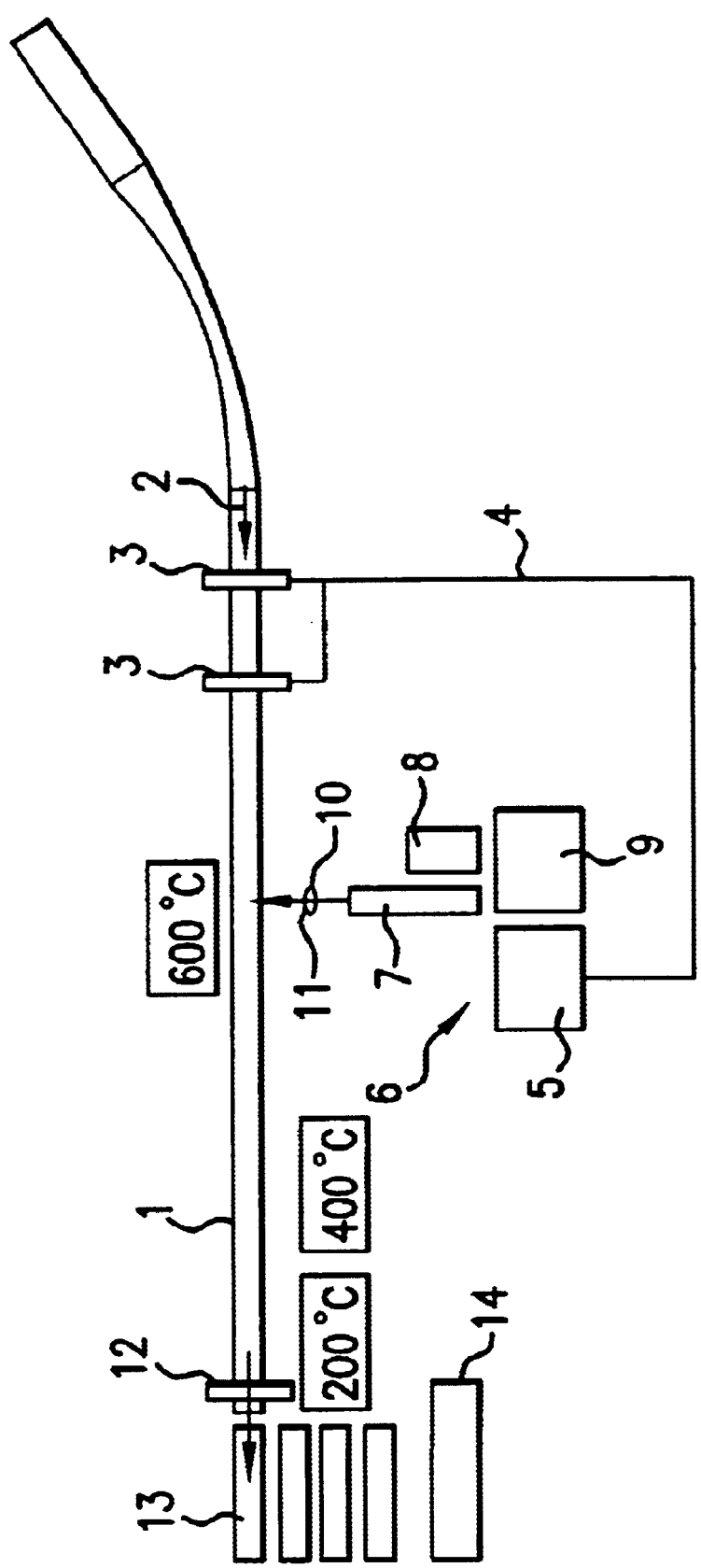
FIG. 3 shows a tube drawing installation comprising an embodiment of the apparatus according to the invention for the marking of glass.

FIG. 3 shows an installation for the continuous production of glass of glass tubing for example, in a tube drawing installation. The Danner process which is known from U.S. Pat. No. 1,218,598 can be used for this purpose, for example. Furthermore, the Vello process, the A-Zug process (DE-AS 1025 581) or another glass drawing process can also be used.

In the tube drawing installation the glass material 1 is moved substantially in translation at a defined speed in the direction of arrow 2. The drawing speed is less than 6 m/sec, preferably about 4 m/sec.

In the tube drawing installation shown in FIG. 3, the drawn glass tubing, which consists of the glass material 1, firstly passes through measuring instruments 3. Measuring instruments 3 are used for investigating one or more properties of the glass material 1, for example for checking for bubbles, protuberances or other irregularities in the material, for defects, or for investigating other properties. The measuring instruments can also advantageously be disposed at about the location of the point denoted by 400° C. along the glass strand. If laser marking is to be used for marking defects, then in this case the laser has to be located downstream of the measuring instruments in the direction of drawing.

If a certain test condition is not complied with, the measuring instruments 3 emit a corresponding signal which is transmitted via a line 4 to a drive unit 5 of a laser 6.

Apart from the drive unit 5, the laser 6 consists of a $CO_2$ laser head 7 and of an appropriate cooling device 8 and a high-frequency power supply 9. When it is correspondingly triggered by the drive unit 5, the laser head 7 generates a $CO_2$ laser pulse which is directed via focusing optics 10 on to the glass material 1.

On its side facing the glass material 1, the focusing optics 10 comprises a lens flushing device 11, which is not illustrated in detail in FIG. 3. In the example considered here, the temperature in the region where the laser beam from the laser head 7 impinges on the glass material 1 is about 600° C., and is therefore above the transformation temperature of the glass material 1.

In the following sections of the tube drawing installation, the temperature of the glass material 1 continuously falls to 400° C. and to 200° C., respectively. At the back end of the tube drawing installation there is a drawing machine 12 which sets the glass material 1 in the desired translational motion. Downstream of the drawing machine 12, the drawn glass material is subdivided into tubes 13 which are subjected to post-treatment 14 if necessary.

The laser head 7 is controlled by the drive unit 5 of the laser 6 so that the glass material 1 of the drawn tubing which passes by is acted upon by laser pulses which essentially result only in a thermal effect on the surface of the glass material 1, as explained above with reference to FIGS. 1 and 2. The exact position for the application of a mark is determined by the focusing optics 10.

In the example of an embodiment which is shown in FIG. 3, the focusing optics 10 are situated at a working distance of about 63.5 mm from the surface of the glass material 1. Any deviations from the ideal focus due to variations in the drawn tubing of ±1 mm, for example, can be neglected, due to the extent of the depth of focus of the radiation.

The lens flushing device 11 ensures that the focusing lens of the focusing optics 10 is flushed with a directed gas stream in order to protect the focusing lens from glass dust or the like, for example.

For example, the laser parameters of the drive unit 5 can be set so that the pulse width $t_{pulse}$ (see FIG. 2) is 60 $\mu$s and the pulse frequency is 10 kHz. The peak power can be about 200 W, which corresponds to a mean power of about 120 W. Due to the drawing speed of about 4 m/s, a mark is thereby formed by means of strokes with stroke dimensions of about 0.25×0.1 mm, wherein the strokes are each spaced apart by about 0.4 mm on the surface of the glass material 1.

The marks which are thus produced can be seen with the naked eye, without means of assistance, on the final glass tubing product 13 and on products which have been subsequently processed, e.g. ampoules. No external protrusions are induced on the glass surface, and no negative stresses or even microcracks are induced. This can be verified, for example, by heat treatment of the ampoules, (annealing furnace) and thermal shock, where the corresponding products do not exhibit any differences compared with unmarked products.

Figure 4:
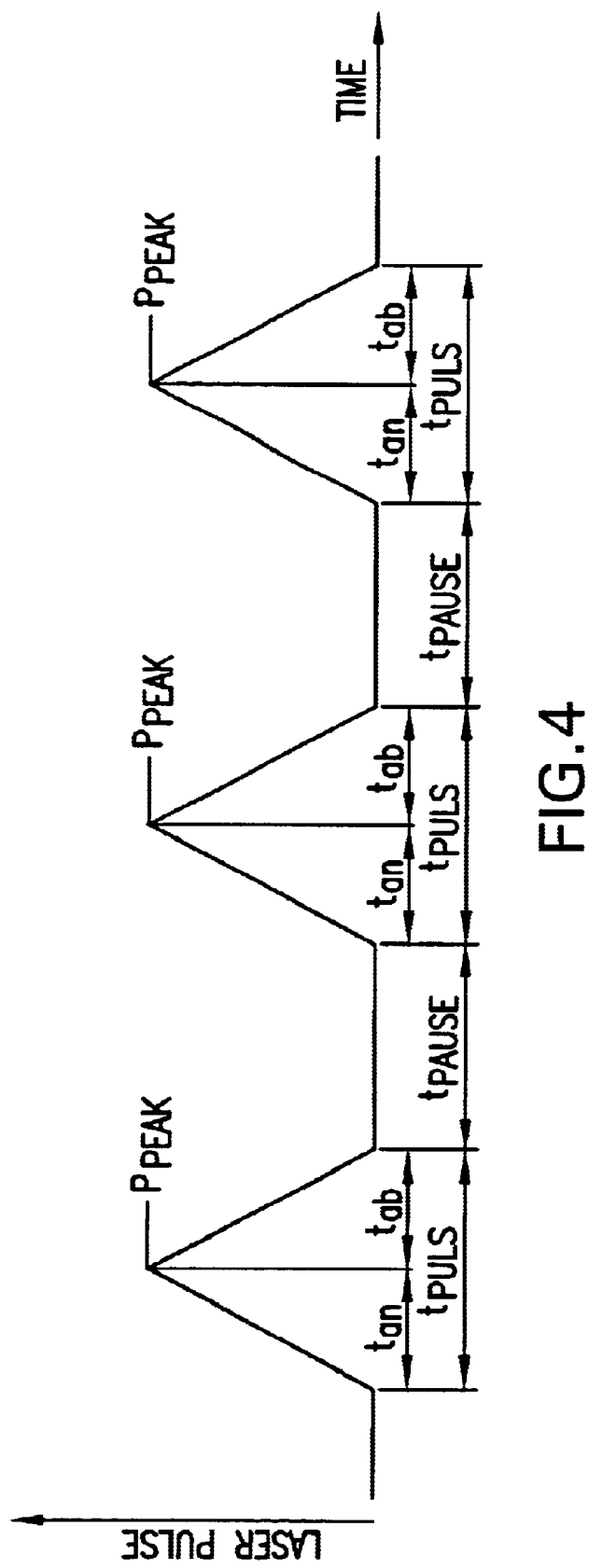
FIG. 4 shows the pulse/spacing ratio of the quasi-continuous laser beam which is used in the tube drawing installation of FIG. 3.

FIG. 4 is an illustration of the time-dependence of the laser pulses emitted by the laser head 7 (see FIG. 3). The shape of these pulses corresponds to the laser pulse shown in FIG. 2. The spacing between the marking strokes produced on the surface of the glass material can be varied by varying the duration of the pulse spacing $t_{spacing}$.

Figure 5:
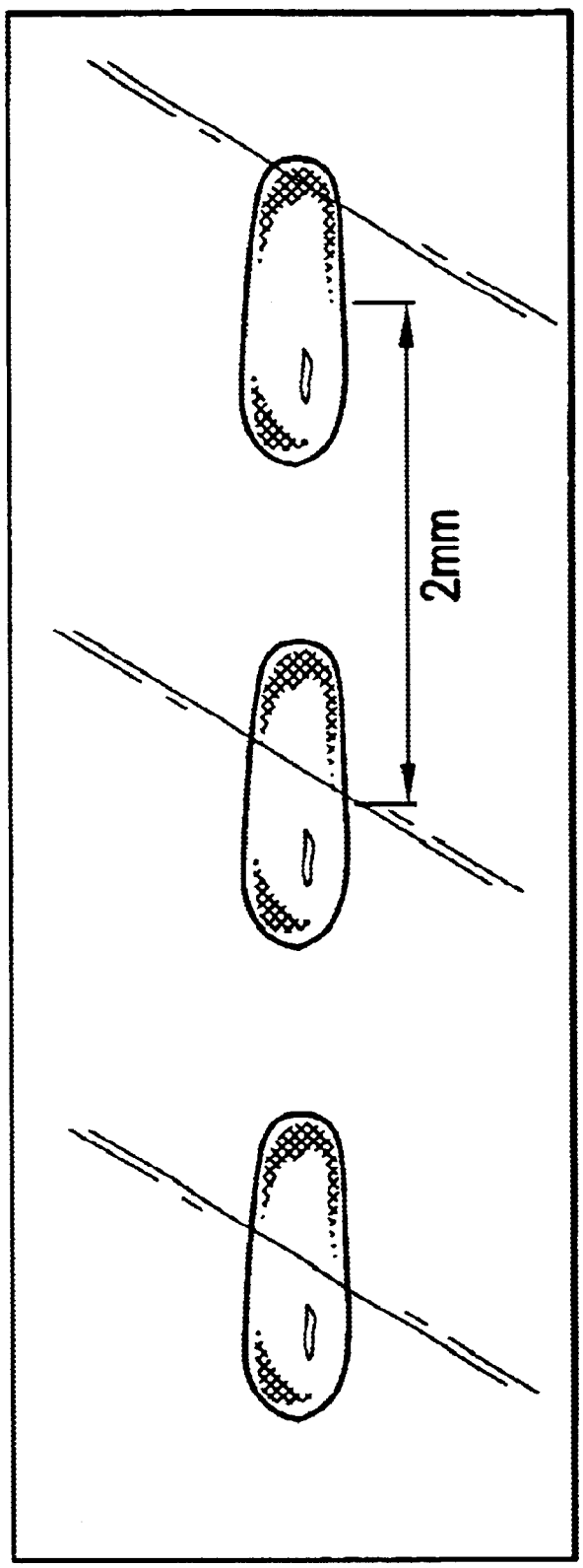
FIG. 5 shows the mark produced by the quasi-continuous laser beam of FIG. 4 on the glass surface.

FIG. 5 shows the corresponding marking strokes on an enlarged scale. The mid-points of the individual marking strokes are about 2 mm apart, due to the parameters selected.

By appropriately designing the focusing optics 10 (see FIG. 3), however, any marked patterns can be produced on the glass surface. These can be decorative patterns, trade marks, logos, product requisites or any other markings, for production monitoring purposes, for example.

Furthermore, it is also possible for the laser 6 and/or the focusing optics 10 to be disposed so that they can move parallel to the drawn tubing relative to the tube drawing installation, so that the laser beam can also move parallel to the glass material 1 in the direction of arrow 2 over a certain section, in order to apply more complex patterns to the surface of the glass material 1, for example. It is thereby possible for the optics to move at the drawing speed, simultaneously with the movement of the tubing.

Alternatively, a scanning device can also be used. After completion of the corresponding marking operation, the laser 6 and/or the focusing optics 10 are returned to the home position again, to prepare for a renewed marking step.

While various descriptions of the present invention are described above, it should be understood that the various features could be used singly or in any combination thereof.

Therefore, this invention is not to be limited to only the specifically preferred embodiments depicted herein.

Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A method of marking glass, comprising the following steps:
   a) selecting a marking position as a position along a glass drawing process at which the glass is above its transformation temperature,
   b) acting upon the glass at the marking position with a laser pulse to apply a mark to a surface of the glass.

2. The method according to claim 1, wherein the laser pulse only briefly attains a peak power.

3. The method according to claim 2, wherein the peak power of the laser pulse is selected depending on physical parameters of the glass so that there is merely a thermal effect on the surface to be marked.

4. The method according to claim 1, wherein the glass is acted upon by a pulsed laser beam.

5. The method according to claim 1, wherein the glass is moved relative to the laser beam at a drawing speed in a drawing installation.

6. The method according to claim 1, wherein the laser pulse has a rise time of 25 to 60 $\mu$s and a decay time of 25 to 60 $\mu$s.

7. The method according to claim 1, wherein the pulse width of the laser pulse is less than 300 $\mu$s, preferably less than 130 $\mu$s, particularly 60 $\mu$s.

8. The method according to claim 1, wherein the glass is tested with regard to a property and a corresponding mark is applied by means of the laser pulse in the presence or absence of said property.

9. The method according to claim 1, wherein the laser pulse is generated by a $CO_2$ laser.

* * * * *